(12) United States Patent
Farrelly

(10) Patent No.: US 11,498,612 B2
(45) Date of Patent: Nov. 15, 2022

(54) ELECTRIC POWER ASSISTED STEERING

(71) Applicant: ZF Automotive UK Limited, Solihull (GB)

(72) Inventor: James Owen Patrick Farrelly, Kenilworth (GB)

(73) Assignee: ZF Automotive UK Limited

( * ) Notice: Subject to any disclaimer, the term of this patent is extended or adjusted under 35 U.S.C. 154(b) by 347 days.

(21) Appl. No.: 16/652,054

(22) PCT Filed: Oct. 18, 2018

(86) PCT No.: PCT/GB2018/053013
§ 371 (c)(1),
(2) Date: Mar. 29, 2020

(87) PCT Pub. No.: WO2019/077357
PCT Pub. Date: Apr. 25, 2019

(65) Prior Publication Data
US 2020/0247461 A1  Aug. 6, 2020

(30) Foreign Application Priority Data

Oct. 18, 2017  (GB) ..................... 1717135

(51) Int. Cl.
*B62D 5/04* (2006.01)
*B62D 15/02* (2006.01)

(52) U.S. Cl.
CPC ....... *B62D 5/0463* (2013.01); *B62D 15/0215* (2013.01)

(58) Field of Classification Search
CPC .. B62D 5/0409; B62D 5/0421; B62D 5/0463; B62D 5/046; B62D 15/0215
See application file for complete search history.

(56) References Cited

U.S. PATENT DOCUMENTS

| 7,664,583 B2 * | 2/2010 | Fernandez | B62D 5/0463 180/443 |
| 9,731,757 B2 * | 8/2017 | Bean | B62D 6/008 |

(Continued)

FOREIGN PATENT DOCUMENTS

| CN | 105292246 A | 2/2016 |
| CN | 107097846 A | 8/2017 |

(Continued)

*Primary Examiner* — Tony H Winner
*Assistant Examiner* — Michael R Stabley
(74) *Attorney, Agent, or Firm* — Robert James Harwood

(57) ABSTRACT

An electric power assisted steering apparatus comprises a steering mechanism which operatively connects a steering wheel to the road wheels of a vehicle, an electric motor operatively connected to the steering mechanism, a torque signal generator adapted to produce a torque signal, a column angular position signal generator for producing a column angle signal and a signal processing unit adapted to receive the column torque signal and the column angle signal and to produce therefrom a torque demand signal representative of a torque to be applied to the steering mechanism. A torque demand signal generating circuit adapted to produce the torque demand signal is a function of both the friction compensating torque and the assistance torque signal, at least partially assists the driver in overcoming the effects of static and/or kinetic friction.

10 Claims, 7 Drawing Sheets

(56) References Cited

U.S. PATENT DOCUMENTS

| | | |
|---|---|---|
| 2002/0019690 A1 | 2/2002 | Kurishige et al. |
| 2004/0079578 A1 | 4/2004 | Kurishige et al. |
| 2014/0088835 A1* | 3/2014 | Sworn ................. B62D 5/0466 701/42 |
| 2014/0288778 A1* | 9/2014 | Bean ....................... B62D 6/08 701/41 |
| 2015/0112551 A1 | 4/2015 | MacLaughlin |
| 2015/0344065 A1 | 12/2015 | Lee et al. |
| 2016/0023678 A1 | 1/2016 | Sakuma et al. |
| 2016/0251027 A1* | 9/2016 | Farrelly ............... B62D 5/0463 701/41 |
| 2018/0009469 A1* | 1/2018 | March .................... B62D 5/049 |
| 2019/0126975 A1* | 5/2019 | Prahlad ................ B62D 5/0463 |

FOREIGN PATENT DOCUMENTS

| | | |
|---|---|---|
| EP | 2771225 B1 | 4/2016 |
| JP | 2017171224 A | 9/2017 |
| KR | 1020130139081 A | 12/2013 |

\* cited by examiner

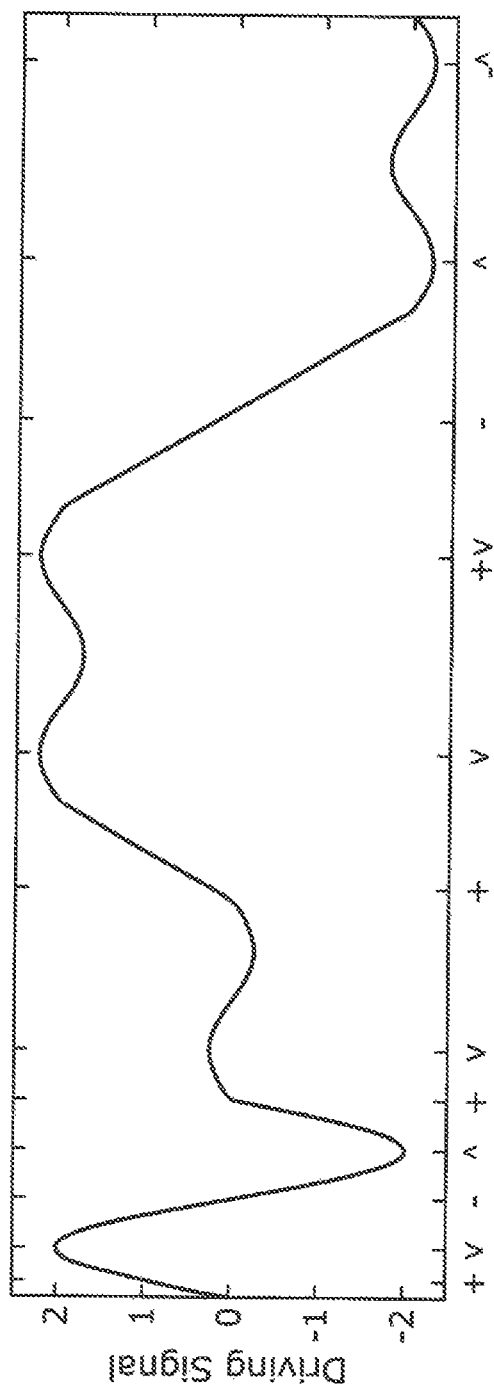
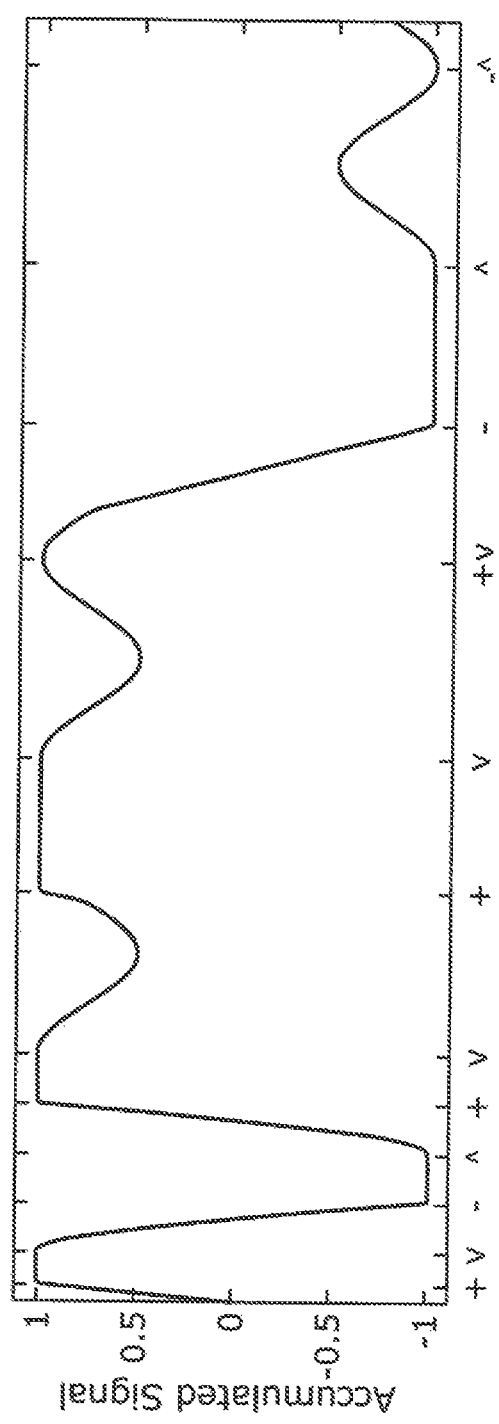

ELECTRIC POWER ASSISTED STEERING

CROSS-REFERENCE TO RELATED APPLICATION

This application is a national stage of International Application No. PCT/GB2018/053013, filed Oct. 18, 2018, the disclosure of which is incorporated herein by reference in its entirety, and which claimed priority to UK Patent Application No. 1717135.6, filed Oct. 18, 2017, the disclosure of which is incorporated herein by reference in its entirety.

TECHNICAL FIELD

This invention relates to electrical power assisted steering systems of the kind in which an electrical motor is adapted to apply an assistance torque to a steering component such as a steering column so as to reduce the driver effort required to control the vehicle.

BACKGROUND

In a typical electric power assisted steering system a torque sensor is provided which is arranged so that the level of torque in a steering column is measured. From this measurement a controller calculates the value of a torque demand signal that is indicative of the torque that is to be generated by an electric motor attached to the steering column. The motor applies a torque to the column of the same sense as that demanded by the driver and thus reduces the effort needed to turn the wheel.

The relationship between the steering column torque and the assistance torque may be set by a boost curve. This is a mapping between the column torque and the assistance torque where for a given input torque a multiplier value is defined that determines an amount by which the input signal is multiplied. To apply a boost, the value of the multiplier for a given input torque will be not unitary, 1.0. For example, if the multiplier is 2.0 then the output assistance torque will be twice the measured torque, if it is 0.5 it will be half the measured column torque. Instead of a multiplier it is also possible to define the relationship between input torque and assistance torque using a look up table, or in any other convenient manner. The boost curve will then be hard coded into the look up table.

Vehicle manufacturers require that steering systems have low levels of friction. The reason for this is that high levels of steering system friction have a negative impact on the driver's perception of the refinement of the steering system. Experienced drivers will report that a steering system with low friction provides sharp, precise feedback of the contact between the tyres and the road; whereas they will report that a steering system with high friction provide vague feedback, of the contact between the tyres and the road. Vehicle manufacturers further require that friction levels are controlled: part to part, over the operating temperature & humidity range, and over the life of the vehicle.

Vehicle manufacturers also require that steering systems have good rattle performance e.g. when excited by a rough road surface input. In an electric power steering system, rattle may be present within the gearbox that connects the motor to the steering column for example. The friction and rattle requirements result in a mechanical design trade-off: a low friction design will have some free play which results in rattle; a low rattle design will have no free play resulting in high friction. Typically, a design that attempts to meets both requirements will make use of: tight manufacturing tolerances, advanced material choices, and advanced lubricant (grease) choices.

There a several different forms of undesirable friction, one of which is stiction or static friction. This is a force between two or more parts of the steering system that is present when they are not moving relative to each other, and which must be overcome if the two or more parts are to be moved. In the case of the steering system, this becomes apparent to the driver when they try to start to turn the wheel from a static position, or on changing the direction in which the wheel is being turned.

SUMMARY

An object of the present invention is to provide a steering apparatus which provides an improved steering feel where the effects of static friction and kinetic friction are at least partially overcome.

According to a first aspect the invention provides an electric power assisted steering apparatus comprising:

a steering mechanism which operatively connects a steering wheel to the road wheels of the vehicle, an electric motor operatively connected to the steering mechanism;

a torque signal generator adapted to produce a torque signal indicative of the torque carried by a portion of the steering mechanism, a column angular position signal generator for producing a column angle signal indicative of the angular position of the steering wheel or steering column and a signal processing unit adapted to receive the column torque signal and the column angle signal and to produce therefrom a torque demand signal representative of a torque to be applied to the steering mechanism by the motor, in which the signal processing means includes:

a first signal processing circuit which receives an input signal dependent on the column torque signal and outputs an assistance torque signal, the relationship between the input and the output of the first signal processing circuit being defined by a boost curve, a second signal processing circuit which generates a friction compensating torque signal, the value of the friction compensating torque being derived from observations of both the column torque signal and the column angle signal over time; and a torque demand signal generating circuit adapted to produce the torque demand signal as a function of both the friction compensating torque and the assistance torque signal, and in which the friction compensating torque signal at least partially assists the driver in overcoming the effects of static and/or kinetic friction in the steering mechanism.

The torque demand signal generating circuit may be arranged to produce the torque demand signal by adding together the friction compensating torque with the assistance torque signal.

The second signal processing circuit may generate a friction compensating torque signal that comprises a first component derived from observations of the column torque signal over time and a second component which is derived from observations of the column angle signal over time.

The two components may be independent of each other such that the value of one is independent of the value of the other.

The second signal processing circuit may be adapted to generate the friction compensating torque signal as a function of the sum of the two independent components. This ensures that the static friction compensation signal may vary even when one of the component values remains zero. For example, if the torque is observed to increase prior to the steering moving, some compensation will be phased in. This, as will become apparent, is beneficial in mitigating the effects of static friction in the system by helping the driver overcome the torque that is otherwise needed to overcome that static friction.

Of course, it is within the scope of the invention for the second signal processing circuit to observe both the column torque signal and column angular signal together to generate the static friction compensation signal without generating two separate components. But conceptually it is simplest to consider the invention in terms of the signal being the result of two independent components.

The applicant has appreciated for the first time that the variation in the value of the column torque signal over time can provide a preview that the driver intends to start steering or to change the steering system direction and that this may be used to introduce a friction compensating component that will ameliorate the effect of static friction even before the column starts to turn. The column angular position signal provides confirmation that the steering system has started to rotate and may be used to generate the second component. This second component also provides compensation for kinetic friction.

There may be times when the change does not represent a precursor to the steering moving, but in this case the applicant has realised that the additional component will go largely un-noticed. Hence the benefit of introducing the component for those times when it is needed, and which have been demonstrated to give a considerable improvement in steering feel in those cases, far outweighs the times when it introduces a component that is not required.

To ensure that the friction compensation signal reacts to all changes in steering direction, both whilst travelling straight and whilst in a curve, and to ensure that the reaction is proportionate to changes in column torque, the second signal processing circuit may be arranged to vary each of the first component and the second component in a fashion proportional to the changes in the driving signals. The first and second components may therefore vary in a manner which is not related to time, only to changes in the underlying drive signals. By drive signal we mean the column torque signal or the column angle signal.

The first component may therefore be dependent on an accumulated column torque signal which has a value that is derived from historically observed values of the column torque signal.

Similarly, the second component may be dependent on an accumulated column angle signal which has a value that is derived from historically observed values of the column angle signal.

The accumulated column torque signal may be generated by the second processing circuit with a value in a range −N to +N, the value saturating at +N for a sustained increase in the column torque signal, saturating at −N for a sustained decrease in the column torque signal, and behaving in a proportional fashion over the range −N to +N, tracking all changes in the column torque signal. The value of N may be any positive number, and is mostly conveniently set as N=1.

The first component may have a value that increases in proportion to an increasing column torque signal for as long as the column torque signal is increasing until the magnitude reaches the upper limit +N, and will then remain at that upper limit for so long as the column torque signal does not decrease, and which decreases in proportion to a decreasing column torque signal until the magnitude reaches the lower limit −N, and will then remain at that lower limit for so long as the column torque signal does not increase.

The first component has no rest value it will retain its last value for so long as the column torque signal value rests at zero for a period of time.

The second component may also vary in the same way, but as a function of the accumulated change in the column angular position signal rather than the column torque signal.

Thus, the second component may have a value in a range between a lower limit −M and an upper limit +M, the value increasing in proportion to an increasing column position until the magnitude reaches the upper limit +M, and remaining at that upper limit for so long as the column position signal does not decrease, and which decreases in proportion to a decreasing column position until the magnitude reaches the lower limit, and will then remain at that lower limit for so long as the column position does not increase, the value of the second component having no rest value, and retaining the last value when the column stops rotating.

The applicant has appreciated that a proportional response is most preferred as it enables the static friction compensation value to be introduced in a manner which is least intrusive to the driver. The response of the friction compensation factor being in proportion to the change of the driving signals.

In one convenient arrangement, the second signal processing circuit may be arranged to produce each of the two components by generating a scaled difference followed by a limited integrator. The scaled difference may be formed by observing the difference between subsequent time samples of the driving signal (torque or column angle) and then scaling them by a factor 1/limit to form a signal 'scaled delta', i.e. differentiation of the input signal followed by scaling. The limited integrator may then cumulatively summate the signal 'scaled delta', limiting the summation to the range −N to +N or −M to +M to give the required saturation at the limits. The required component is the output from the limited integrator.

The upper limit and the lower limit of each of the two compensation signals, +/−M an +/−N may be set to be equal to +1 and −1 and the second signal processing circuit may be arranged to combine the two components with some additional scaling to give a friction compensation factor that is also in the range +1 to −1 which may in one arrangement be determined using an equation of the form:

Friction compensation factor=$X$*Accumulated column angle+$Y$*Accumulated column torque Where X and Y are scaling factors. Most conveniently these may both be set in the range 0.4 to 0.6, although giving them substantially equal weighting of 0.5 may be preferable, so that in the case where N and M are set to 1 the function will give a friction compensation factor in the range +1 to −1. The compensation factor is therefore the sum of the two independent components. The summation of these independent components results in a friction compensation factor (and hence torque) that pre-empts the execution of each and every steering manoeuvre (as the driver needs to apply torque to the steering wheel in order for the steering system to start rotating). To effectively compensate the negative effects of steering system friction it is important that the friction compensation torque is applied as the driver executes the manoeuvre. By contrast a friction compensation torque based on column torque only would tend to be applied too early, whereas a friction compensation torque based on column angle would tend to be applied too late.

The second signal processing circuit may then be configured to multiply the friction compensation factor by a friction compensation torque gain, which typically corresponds to a predefined friction value that may be stored in a memory of the apparatus, to give a torque value that defines the value of the friction compensation signal.

For instance, in a system where it is known that a torque of 2 Nm is required to overcome the negative effects of friction in the steering mechanism, a gain factor of 2 Nm may be chosen which will results in a friction compensation signal being applied resulting in an additional torque component being added to the assistance torque, allowing the driver to turn the wheel without feeling any excess drag caused by friction in the system.

The first signal processing means may use a boost curve which comprises a mapping of desired assistance torque against input signal value, the gain increasing linearly, or non-linearly, with an increase in input signal value. The assistance torque produced by the apparatus will either be the value output from the boost curve, or that value plus any additional offset torque applied to the output of the boost curve. Of course, further processing of the signals may be provided to achieve the final assistance torque value.

The apparatus may include an area of electronic memory in which the function defining the scaling factors or boost curves, and/or any look-up tables are stored. The upper limit and lower limits, N and M, of each of the first and second components, and the friction compensation factor map (or related parameters X and Y) may be fixed, or may be varied over time. They may, for example, be varied as a function of vehicle speed, column position, or temperature, which may be the temperature of a part of the steering apparatus or the ambient temperature.

The torque signal generator may comprise a single sensor which is connected to the steering column or another mechanical component attached to it.

The signal processing unit may be implemented by a processor that executes program instructions stored in an area of memory. The instructions may cause the processor to perform a number of distinct steps or functions, which define the different sub-units of the signal processing unit. However, it may be possible to implement the signal processing unit using discrete electronic components such as digital logic gates, a group of logic gates forming each sub-unit.

The apparatus may include a motor drive circuit which receives the torque demand signal and applies appropriate signals to a motor drive stage to cause the motor to output the demanded torque. This drive stage will typically comprise a bridge circuit.

BRIEF DESCRIPTION OF THE DRAWINGS

There will now be described by way of example only two embodiments of the present invention with reference to and as illustrated in the accompanying drawings of which:

FIGS. 8(a) and (b) show a sample driving signal and the resulting accumulated signal produced within the embodiment of the invention illustrated in the figures.

DETAILED DESCRIPTION

Figure 1:
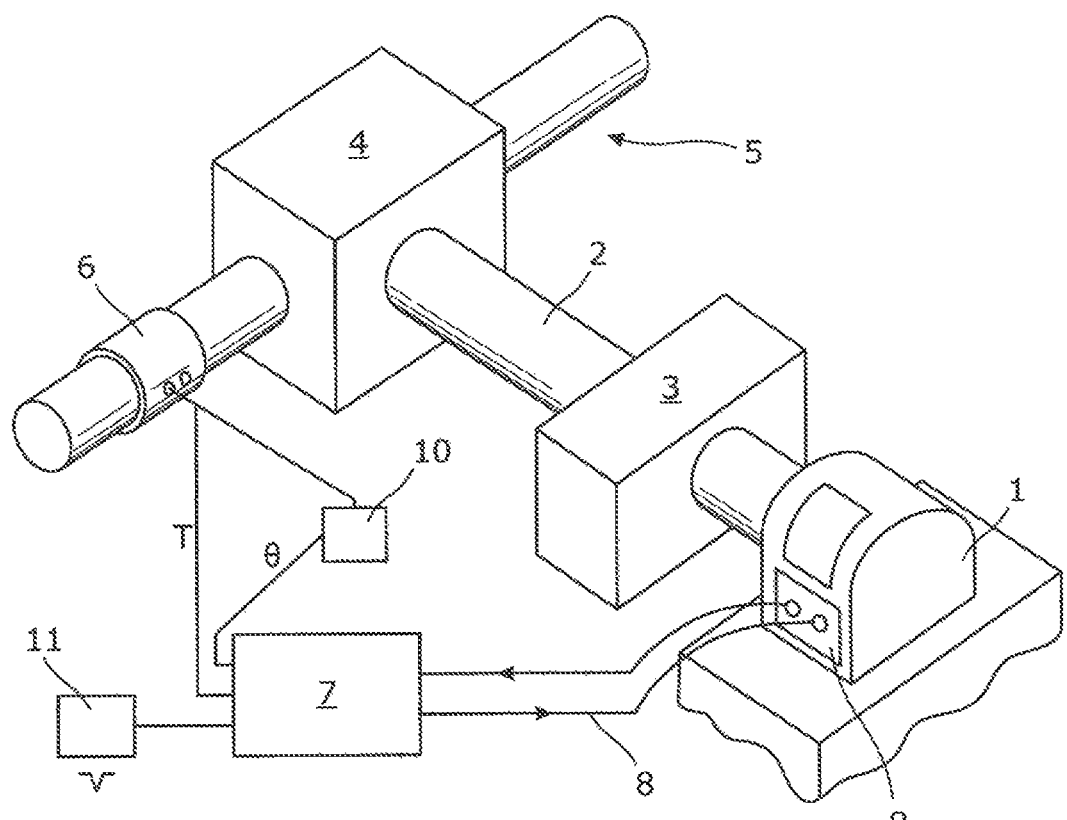
FIG. 1 is a schematic diagram of an electric power assisted steering system in accordance with the present invention.

A typical electric power assisted steering system is illustrated in FIG. 1 of the accompanying drawings. The system comprises an electric motor 1 which acts upon a drive shaft 2 through an (optional) gearbox 3. The drive shaft 2 terminates with a worm gear 4 that co-operates with a wheel provided on a portion of a steering column 5 or a shaft operatively connected to the steering column. For instance the motor may act upon a steering rack of the steering system. Of course, this is not to be taken as limiting to the scope of protection we are seeking, and other power assisted steering systems are envisaged to which the invention has application. For example, instead of a column drive system as shown where the motor acts on the steering column the system may be of the so-called belt drive type in which the motor is connected directly to the steering rack.

The steering column 5 carries a torque sensor 6 that is adapted to measure the column torque Tcol carried by the steering column that is produced by the driver of the vehicle as the steering wheel (not shown) and hence steering column is turned against the resisting force provided by the vehicles road wheels (also not shown). The output signal, referred to herein as the torque signal Tcol from the torque sensor 6 is fed to a first input of a signal processing unit 7.

An angular position sensor 10 is also provided on the steering column shaft. As shown in FIG. 1 this is coupled to the torque sensor 6 because it measures the position by monitoring the signal output from the torque sensor. This produces an output signal indicative of the angular position Qcol of the steering column, referred to herein as the column position signal. The output from the position sensor, Qcol is fed to a second input of the signal processing unit 7. This may comprise an electronic processor unit or other electronic circuitry.

The signal processing unit 7 acts upon the two input signals to produce, as its output, a torque demand signal 8 that is passed to a motor controller 9. The motor controller 9 converts the torque demand signal 8 into drive currents for the electric motor 1. To produce this demand signal the processing unit includes a number of sub-circuits, each of which performs a single processing step or a specific set of steps.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

Figure 2:
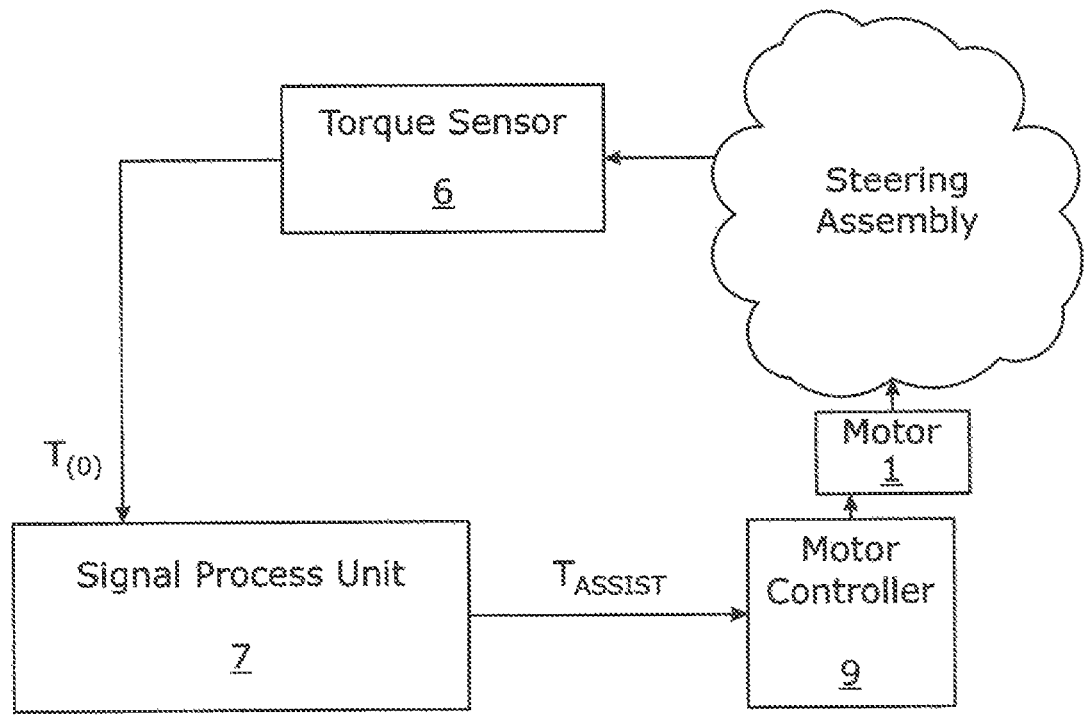
FIG. 2 is a block diagram representing the closed loop control of the motor in the system of FIG. 1.

The motor controller 9 receives as its input the torque demand signal and produces currents that are fed to the motor to reproduce the desired torque at the motor drive shaft 2. It is this assistance torque applied to the steering column shaft 5 that reduces the effort needed by the driver to turn the wheel. This forms a closed control loop as shown in FIG. 2.

The torque demand signal 8 is made up of at least two parts. The first part is an assistance torque Tassist which depends on the amount of torque a driver is applying to the steering column through the wheel, as determined from the value on the torque signal Tcol. The second part is an (optional) damping torque demand which is provided in order to improve the steering feel and/or enhance the safety of the system. Other torque demand signals can be used in addition, for example to help to counter the effects of cross winds on the vehicle which can cause it to stray from an intended path.

As noted above, the assistance torque signal is derived as a function of the torque in the steering column as measured by the torque sensor 6. The relationship between the measured torque and the assistance signal is essentially linear. However, other possible relationships may be used to map the torque to the assistance signal. As is widely known in the art, the relationship between the input and output defines a boost curve. As the measured torque increases the magnitude of the assistance signal generally increases. It will also be understood that the assistance torque signal may be dependent upon other parameters such as vehicle speed if required and the steering column position. In that case it is typical to reduce the value of the assistance torque signal at high speeds to enhance stability and increase it at very low speeds to ease parking manoeuvres.

Figure 3:
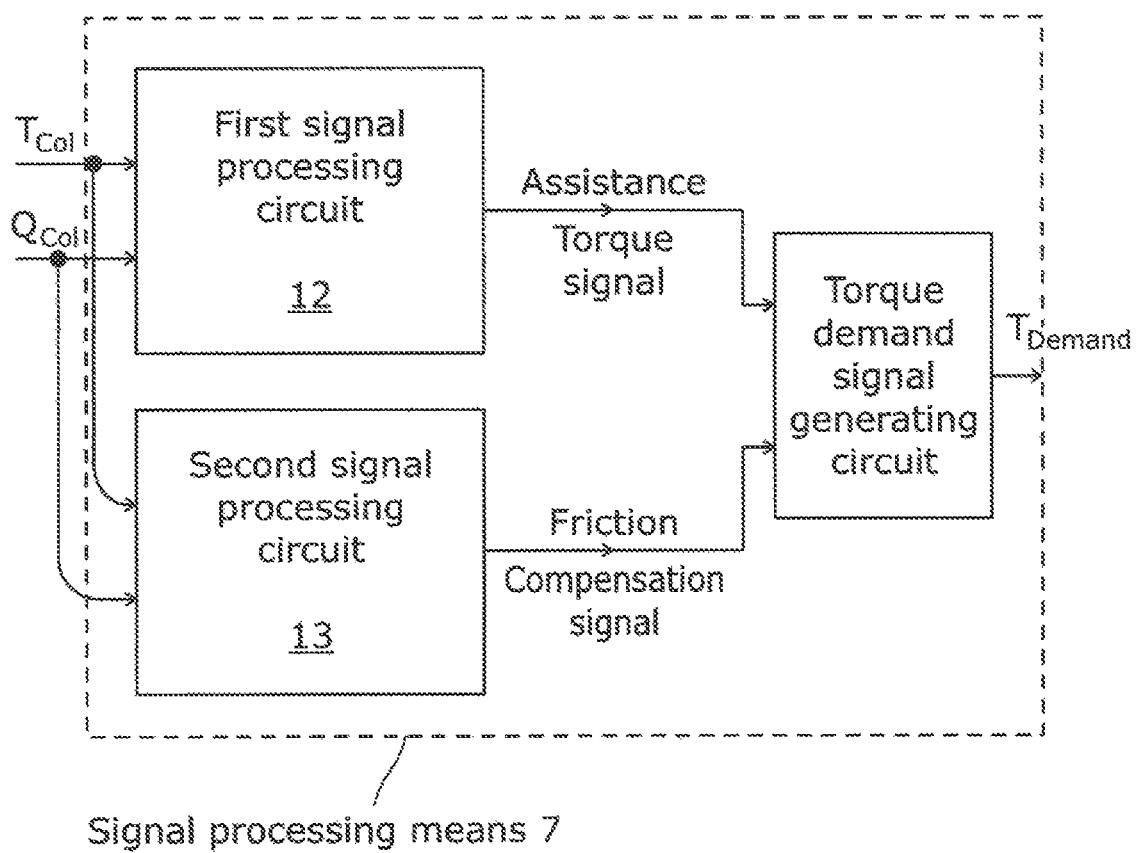
FIG. 3 is a block diagram illustrating the functional steps undertaken by the signal processing means in an embodiment of a steering assembly in accordance with the invention to produce the torque demand signal.

FIG. 3 shows schematically more detail of the signal processing means of the apparatus according to an embodiment of the present invention. As can be seen the signal processing means 7 comprises a first signal processing circuit 12 which applies the boost curve to an input signal that is a function of the column torque. The output of this boost curve defines the assistance torque. In addition, it also includes a second processing circuit 13 that in this example is in parallel to the first circuit 12. The second circuit receives as an input the column torque signal Tcol and generates an additional signal that modifies the torque demand signal under certain vehicle operating conditions. The purpose of the modification, as will be explained below, is to introduce an additional torque component that cancels out, at least partially, any effect of friction in the system. Significantly, the proposal of the present invention is able to reduce the negative feeling due to both static friction as well as kinetic friction in the system.

The second processing circuit 13 acts to apply an increase to the torque demand signal under defined circumstances. These circumstances are that the driver applied torque is increasing or decreasing, and as an independent factor that the steering column is moving in one direction or the other rather than being stationary. In particular, the additional amount of torque is increased or phased in gradually in a proportional manner until a limit value is reached, and similarly is phased out when the driver applies a torque in the opposite direction or reverses the rotation. Importantly, the additional torque will be phased in when only one of the two conditions is met, so that it will start to be phased in when a driver applied torque is introduced even prior to the column starting to move. In that respect the torque and column angle may be considered to have an independent effect on the value of the compensation signal.

The applicant has appreciated that it is possible to "predict" that the steering is going to move from being static to rotating by observing the driver applied torque and from this start to introduce a component to the torque demand signal that cancels out any resisting torque that the driver would otherwise have to overcome that is due to static friction in the system. By further combining this with an additional amount when the steering does start to move a very good steering feel can be achieved, with the driver having little sense of any static friction in the steering system.

The driver's negative perception of steering arises both: when the driver attempts to start steering from a non-rotating steering condition, and when the driver attempts to change the direction of rotation of the steering system.

To phase in this additional component, the second signal processing circuit observes, or monitors, independently both the torque signal Tcol and the position signal Qcol. When it observes that either one is increasing or decreasing the additional component will be phased in, until it reaches a limit value if the condition continues to be met or until it is to be phased out again.

Figure 4:
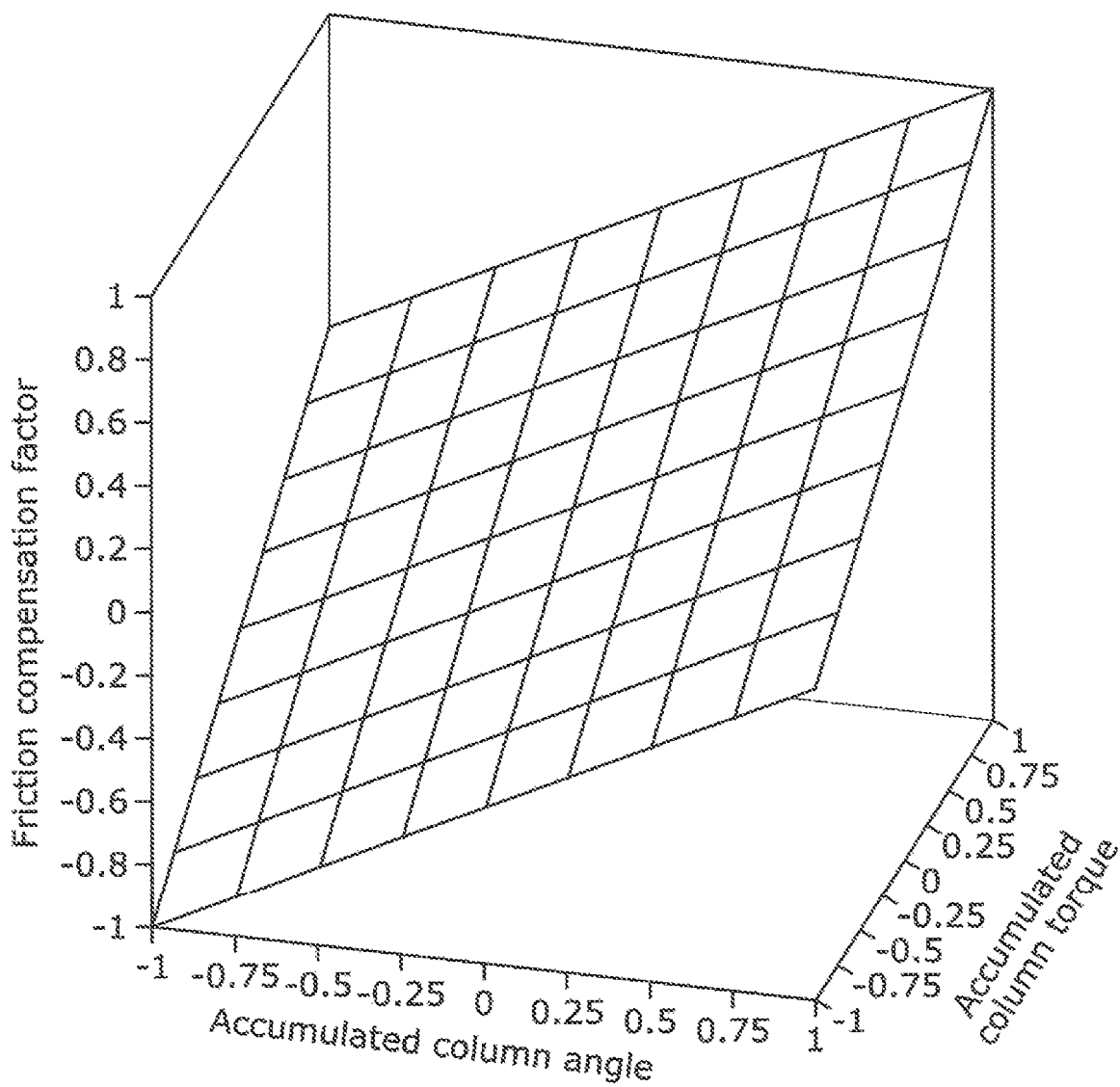
FIG. 4 is a mapping for two components that is used during the generation of a friction compensation signal.
Figure 7:
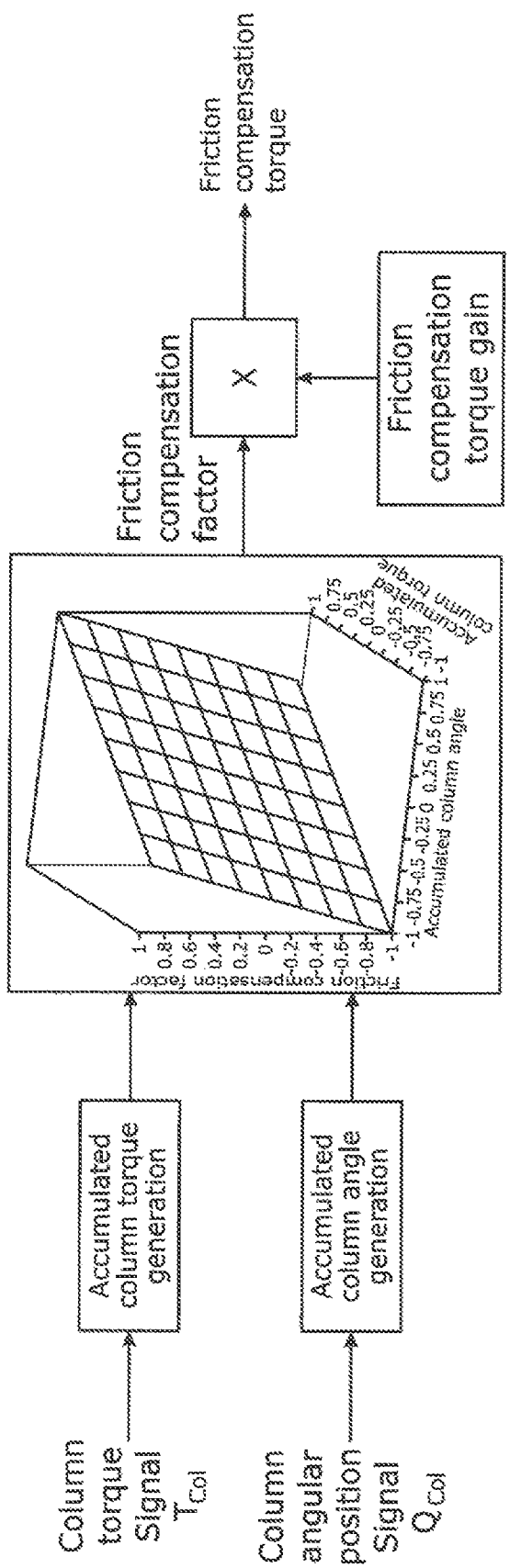
FIG. 7 is a block diagram illustrating how the friction compensation factor is used to generate the friction compensation signal.

The value of the additional friction compensation signal that is to be added is defined by a mapping between a signal referred to the accumulated column torque that is derived from the column torque and a signal referred to as the accumulated column angle derived from the column angle signal which provides a friction compensation factor, that is in turn multiplied by a friction compensation torque gain. An exemplary mapping is shown in FIG. 4. Of course, other mappings are possible within the scope of this invention. FIG. 7 shows how the gain is applied to the map to produce the final friction compensation torque value. Note that the functionality of FIG. 7 is all implemented by the second signal processing circuit 12 in this embodiment.

It can be seen that the mapping is based on two component parts, each independent in value, with a first one dependent on observations of the column torque signal and the second based on observations of the column position signal.

Typically the range for the column angle component will be chosen so that the complete transition from zero to either the upper limit or lower limit occurs over 0.1 to 1.0 degrees of column movement. Similarly, the range for the column torque signal component will be chosen so that he complete transition occurs from zero to either the upper or lower limit when the torque signal changes by 0.1 to 1.0 Nm.

Figure 5:
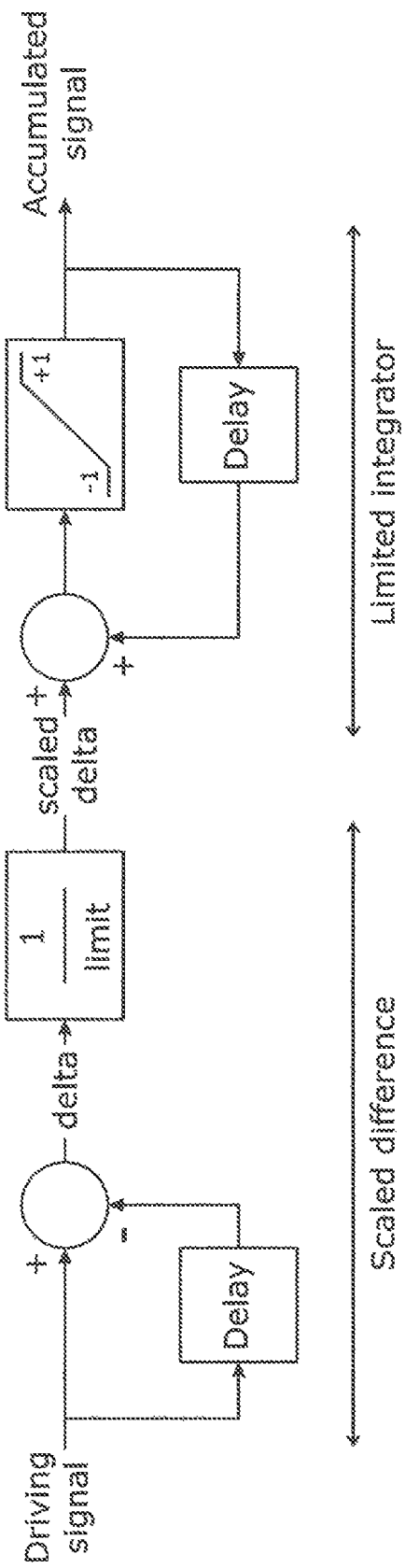
FIG. 5 is a block diagram that shows how a driving signal, which may be a torque signal or a column angle signal, is used to generate an accumulated signal for input to the map of FIG. 4.

FIG. 5 shows one specific implementation method for producing the two components that make up the friction compensation signal. For the column torque component, the implementation in this embodiment consists of a scaled difference followed by a limited integrator. The scaled difference forms the difference between subsequent time samples of the driving signal and scales them by a factor 1/limit to form signal 'scaled delta'. 'limit' is the magnitude value of the upper/lower torque. The limited integrator cumulatively summates the signal 'scaled delta', limiting the summation to the range −1 to +1. The first component will therefore take a value in the range −1 to +1, saturating at the upper or lower limits with a sustained increase or decrease in driver applied torque.

The second component is produced in exactly the same way, but based on the column position.

FIGS. 8(*a*) and (*b*) show an exemplary drive signal, which may be the column torque signal or the column angle signal, and the corresponding accumulated signal that will be generated. The saturation at the limits can be clearly seen, as well as the tracking of small variations in the drive signal.

The two components are then summed together, most conveniently with some additional scaling to give a friction compensation factor that is also in the range +1 to −1 as follows:

Friction compensation factor=0.5*Accumulated column angle+0.5*Accumulated column torque The 0.5 terms ensure that the required output range of +1 to −1 is achieved. Of course, other terms could be used, and the two components could be given unequal weightings if desired.

This friction compensation factor may then be multiplied by a gain factor, which typically corresponds to a predefined friction value that may be stored in a memory of the apparatus, to give a torque value. For instance a friction value of 2 Nm to 3 Nm is typical, representing the torque a driver must apply simply to overcome the friction inherent in the system to turn the steering wheel, so a gain factor of 2 Nm to 3 Nm may be applied to cancel this out.

Figure 6:
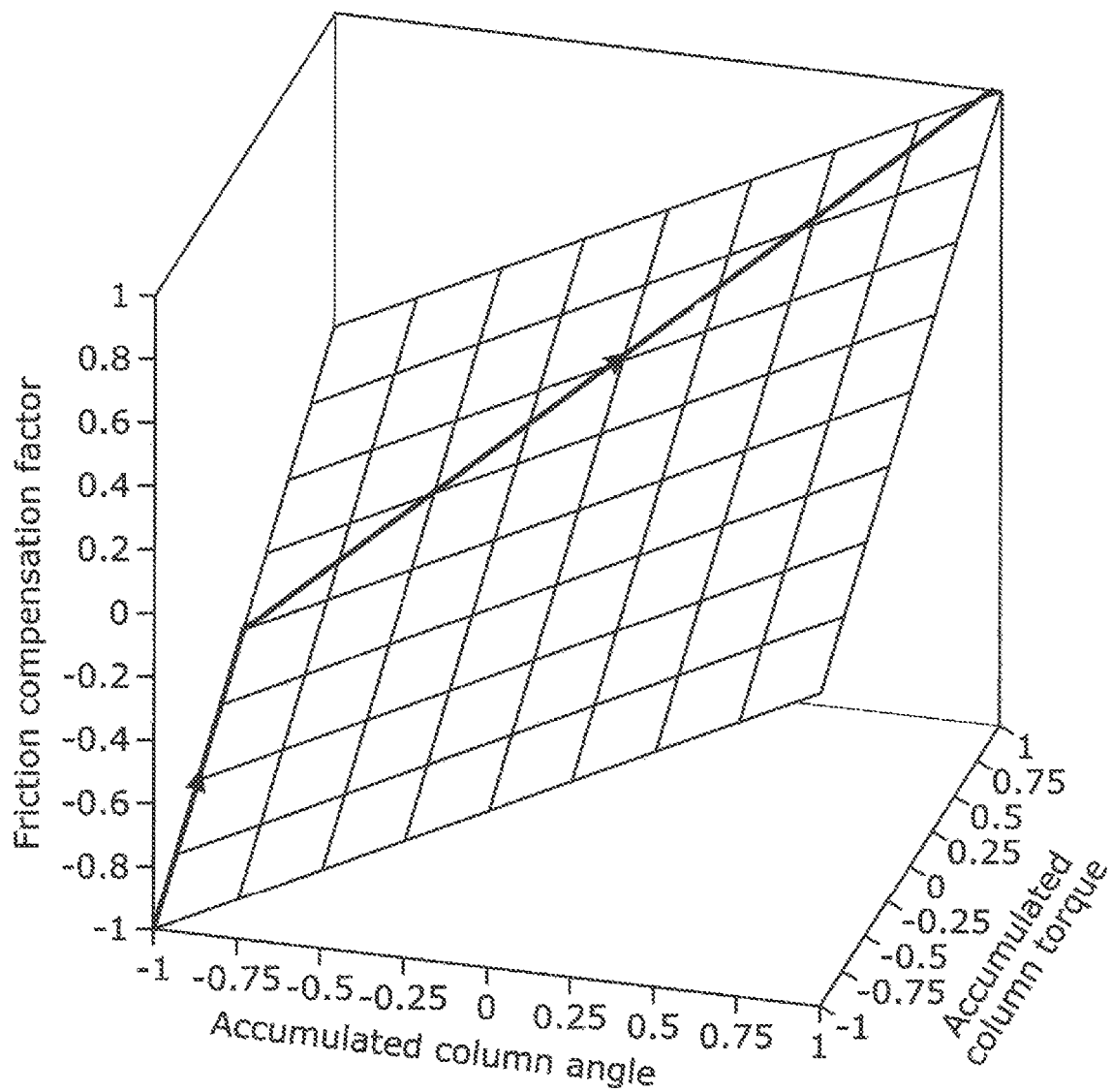
FIG. 6 shows how the friction compensation factor moves across the map as the driver applies a torque and subsequently turns the steering wheel during an exemplary manoeuvre.

FIG. 6 shows a typical trajectory of 'accumulated column torque' and 'accumulated column angle' across the map for a change in steering rotation from counter-clockwise direction to clockwise direction. The driver initiates the change of direction by increasing the column torque (first arrow), the accumulated column torque signal increases from −1 towards 0, the friction compensation torque factor increases from −1 to −0.5 to support the anticipated change in rotation direction. The steering system rotation direction starts to change (2nd arrow), the column angle starts to increase, the accumulated column angle starts to increase from −1 towards +1 whilst accumulated column torque further increase from 0 to 1, the friction compensation torque increases from −0.5 to +1 reflecting the confirmation of change of steering direction.

For a steering system design where the steering friction level is fixed, and does not change: part to part, and with temperature, humidity, and age; the above fixed friction compensation is sufficient. For steering system designs where these variations do occur, some variation in the amount of friction compensation may be beneficial.

The variations mentioned above occur over a long timescale. From the perspective of a single steering system part to part variation occurs once when manufactured, and is fixed thereafter. Friction changes due to age are very slow, perceptible changes will occur over months to years. Whilst air humidity can change quickly, the effect on steering system components (swelling/contraction of plastic parts) is slow taking place over many days. Again, air temperature can change quickly (e.g. due to passenger compartment air conditioning, or under vehicle heat soak due to a hot exhaust), but the steering system has large thermal mass so steering system core temperature changes over many minutes to hours.

The applicant has appreciated that the compensation can be easily adapted by changing the value of the friction compensation torque gain applied to the map as a function of one or more parameters that include, but are not limited to, the temperature of one or more parts of the system or the ambient temperature, The described embodiment may provide a range of benefits over the prior art. In particular, by introducing compensation for a fixed level of steering system friction the trade-off between friction and rattle can be relaxed. A steering system can be mechanically designed with a high level of friction and low rattle. The compensation then cancels the negative impact on steering feel of the high friction, including static friction, restoring the driver perception of a low friction steering system.

The invention claimed is:

1. An electric power assisted steering apparatus comprising:
   a steering mechanism which operatively connects a steering wheel to the road wheels of the vehicle, an electric motor operatively connected to the steering mechanism;
   a torque signal generator adapted to produce a torque signal indicative of the torque carried by a portion of the steering mechanism,
   a column angular position signal generator for producing a column angle signal indicative of the angular position of the steering wheel or steering column and
   a signal processing unit adapted to receive a column torque signal and the column angle signal and to produce therefrom a torque demand signal representative of a torque to be applied to the steering mechanism by the motor, in which the signal processing means includes:
     a first signal processing circuit which receives an input signal dependent on the column torque signal and outputs an assistance torque signal, the relationship between the input and the output of the first signal processing circuit being defined by a boost curve,
     a second signal processing circuit which generates a friction compensating torque signal comprising a first component derived from observations of the column torque signal over time and a second component derived from observations of the column angle signal over time, the value of the friction compensating torque signal being derived from observations of both the column torque signal and the column angle signal over time, the friction compensating torque signal at least partially assists the driver in overcoming the effects of static and/or kinetic friction in the steering mechanism; and
     a torque demand signal generating circuit adapted to produce the torque demand signal as a function of both the friction compensating torque signal and the assistance torque signal.

2. An electric power assisted steering apparatus according to claim 1 in which the torque demand signal generating circuit is arranged to produce the torque demand signal by adding together the friction compensating torque signal with the assistance torque signal.

3. An electric power assisted steering apparatus according to claim 1 in which the two components are independent of each other such that the value of one is independent of the value of the other.

4. An electric power assisted steering apparatus according to claim 1 in which the second signal processing circuit is arranged to vary each of the first component and the second component in a fashion proportional to the changes in the respective column torque or column angle signals.

5. An electric power assisted steering apparatus according to claim 4 in which an accumulated column torque signal in use is generated by the second processing circuit with a value in a range −N to +N, the value saturating at +N for a sustained increase in the column torque signal, saturating at −N for a sustained decrease in the column torque signal, and behaving in a proportional fashion over the range −N to +N, tracking all changes in the column torque signal.

6. An electric power assisted steering apparatus according to claim 5 in which the first component has a value that increases in proportion to an increasing column torque signal for as long as the column torque signal is increasing until the magnitude reaches the upper limit +N, and will then remain at that upper limit for so long as the column torque signal does not decrease, and which decreases in proportion to a decreasing column torque signal until the magnitude reaches the lower limit −N, and will then remain at that lower limit for so long as the column torque signal does not increase.

7. An electric power assisted steering apparatus according to claim 4 in which the second component has a value in a range between a lower limit −M and an upper limit +M, the value increasing in proportion to an increasing column position until the magnitude reaches the upper limit +M, and remaining at that upper limit for so long as the column position signal does not decrease, and which decreases in proportion to a decreasing column position until the magnitude reaches the lower limit, and will then remain at that lower limit for so long as the column position does not increase, the value of the second component having no rest value, and retaining the last value when the column stops rotating.

8. An electric power assisted steering apparatus according to claim 3 in which the second signal processing circuit is arranged to produce each of the two components by generating a scaled difference followed by a limited integrator, the scaled difference in use being formed by observing the difference between subsequent time samples of the column torque or column angle signal and then scaling them by a factor 1/limit to form a signal 'scaled delta' and the limited integrator cumulatively summating the signal 'scaled delta', limiting the summation to the range −N to +N or −M to +M to give the required saturation at the limits.

9. An electric power assisted steering apparatus according to claim 8 in which the upper limit and the lower limit of each of the two compensation signals, +/−M an +/−N may be set to be equal to +1 and −1 and the second signal processing circuit may be arranged to combine the two components with some additional scaling to give a friction compensation factor that is also in the range +1 to −1 determined using an equation of the form:

$$\text{Friction compensation factor} = X^* \text{Accumulated column angle} + Y^* \text{Accumulated column torque}$$

Where X and Y are scaling factors.

10. An electric power assisted steering apparatus according to claim 9 in which the second signal processing circuit is configured to multiply the friction compensation factor by a friction compensation torque gain to give a torque value that defines the value of the friction compensation signal.

* * * * *